(12) United States Patent
Kalmar et al.

(10) Patent No.: US 7,934,302 B2
(45) Date of Patent: May 3, 2011

(54) APPARATUS AND METHOD FOR REMOVING COMPRESSOR BLADES

(75) Inventors: Paul L. Kalmar, Zirconia, NC (US); Graham D. Sherlock, Greenville, SC (US); Francis E. Nimmons, Fayetteville, OH (US); J. David Mays, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 12/367,830

(22) Filed: Feb. 9, 2009

(65) Prior Publication Data
US 2010/0162546 A1 Jul. 1, 2010

Related U.S. Application Data

(60) Provisional application No. 61/141,851, filed on Dec. 31, 2008.

(51) Int. Cl.
*B23Q 1/25* (2006.01)
(52) U.S. Cl. ..................... 29/281.1; 29/283.5
(58) Field of Classification Search .............. 29/281.1, 29/244, 281.3, 283.5; 144/195.3, 195.4
See application file for complete search history.

(56) References Cited

U.S. PATENT DOCUMENTS

| | | | |
|---|---|---|---|
| 3,965,948 A | 6/1976 | Lundin | |
| 4,279,067 A * | 7/1981 | Jenks | 29/239 |
| 4,386,993 A * | 6/1983 | Matsuo | 156/358 |
| 4,455,730 A | 6/1984 | Guenther | |
| 5,535,795 A * | 7/1996 | Bunn | 144/195.4 |
| 5,676,360 A * | 10/1997 | Boucher et al. | 269/74 |
| 6,375,423 B1 | 4/2002 | Roberts et al. | |
| 6,430,793 B1 * | 8/2002 | Pedersoli | 29/239 |
| 6,477,773 B1 * | 11/2002 | Wilson et al. | 29/889.1 |
| 6,494,683 B1 | 12/2002 | Nolan et al. | |
| 6,800,829 B1 | 10/2004 | Nimmons | |
| 7,252,081 B2 * | 8/2007 | Havill | 125/23.01 |
| 7,506,423 B2 * | 3/2009 | Iwabuchi et al. | 29/27 C |
| 2002/0085917 A1 | 7/2002 | Roberts et al. | |
| 2005/0133114 A1 * | 6/2005 | Peterson | 144/193.1 |
| 2007/0184182 A1 | 8/2007 | Arness et al. | |
| 2007/0234549 A1 | 10/2007 | Sherlock et al. | |
| 2008/0115648 A1 | 5/2008 | Sherlock et al. | |

FOREIGN PATENT DOCUMENTS

| | | |
|---|---|---|
| DE | 211227 A3 | 7/1984 |
| DE | 4409686 A1 | 9/1995 |
| EP | 1955805 A1 | 8/2008 |

OTHER PUBLICATIONS

European Search Report and Written Opinion issued in connection with corresponding EP Application No. 09179057, Jun. 24, 2010.

* cited by examiner

*Primary Examiner* — Lee D Wilson
(74) *Attorney, Agent, or Firm* — James W. Pemrick; Ernest G. Cusick; Frank A. Landgraff

(57) ABSTRACT

An apparatus and method are provided for removing a blade from a dovetailed slot in a wheel of a rotating machine. At least one device is adapted to apply a pushing force on a first surface of a blade. A turntable for supporting the wheel has indexing capability to advance the wheel by a predetermined amount. The device can be used to remove one or more blades from the wheel.

13 Claims, 3 Drawing Sheets

APPARATUS AND METHOD FOR REMOVING COMPRESSOR BLADES

CROSS-REFERENCE TO RELATED APPLICATIONS

This application claims priority based on U.S. Provisional Application No. 61/141,851 filed Dec. 31, 2008.

BACKGROUND OF THE INVENTION

The invention relates generally to a compressor and more specifically to an apparatus and method for removing compressor blades.

A conventional gas turbine generally operates on the principle of compressing air within a compressor and then delivering the compressed air to a combustion chamber where fuel is added to the air and ignited. Afterwards, the resulting combustion mixture is delivered to the turbine section of the gas turbine where a portion of the energy, generated by the combustion process, is extracted by a turbine to drive the compressor via a shaft.

In multi-stage compressor sections, stators are placed at the entrance and exit of the compressor section, as well as between each compressor stage, for purposes of properly directing the airflow to each successive compressor stage. As a result, stators are able to enhance compressor performance by appropriately influencing airflow and pressure within the compressor section.

Stators generally consist of an annular array of airfoils or vanes. Stators are typically formed in segments as stator vane segments consisting of one or more airfoils supported by the base. The base includes a dovetail to maintain the stator vane unit within the casing. These stator vane segments are individually mounted to the compressor casing to form an annular array, so that the airfoils project radially between an adjacent pair of compressor stages. A rotor with blades occupies the space between the stator vanes. The rotor blades or airfoils are also connected to the rotor wheel via dovetail connection.

After prolonged use, the blades or airfoils of the compressor may need to be repaired or replaced. Some known methods for removing compressor blades from compressor wheels have relied on manual labor. In one method, a first person rests a V-shaped block mounted on the end of a long handle on the leading edge of a blade. A second person then swings a heavy sledgehammer and hits the back of the V-shaped block. This is repeated multiple times until the blade is removed from the wheel. This process is then repeated for the rest of the blades, and is a time consuming and may be a potentially hazardous activity. Another known method uses a hand-held pneumatic jack-hammer to bear on the blade until it is removed. This requires significant physical effort on the part of the jack-hammer operator and may also carry risk of injury.

BRIEF DESCRIPTION OF THE INVENTION

Briefly in accordance with one aspect of the present invention, an apparatus is provided for removing a blade from a dovetailed slot in a wheel of a rotating machine. At least one device is adapted to apply a pushing force on a first surface of a blade. A turntable for supporting the wheel has indexing capability to advance the wheel by a predetermined amount. The device can be used to remove one or more blades from the wheel.

In another aspect of the present invention, a method is for removing a blade from a dovetailed slot in a wheel of a rotating machine. At least one device is provided to apply a pushing force on a first surface of a blade. A turntable is provided for supporting the wheel, and has indexing capability to advance the wheel by a predetermined amount. The device can be used to remove one or more blades from the wheel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including providing an apparatus and method to quickly and safely remove compressor blades, and to reduce the need for serious physical effort by maintenance personnel. In addition, the present invention also reduces the environmental noise in the workplace during a blade removal operation.

Figure 1:
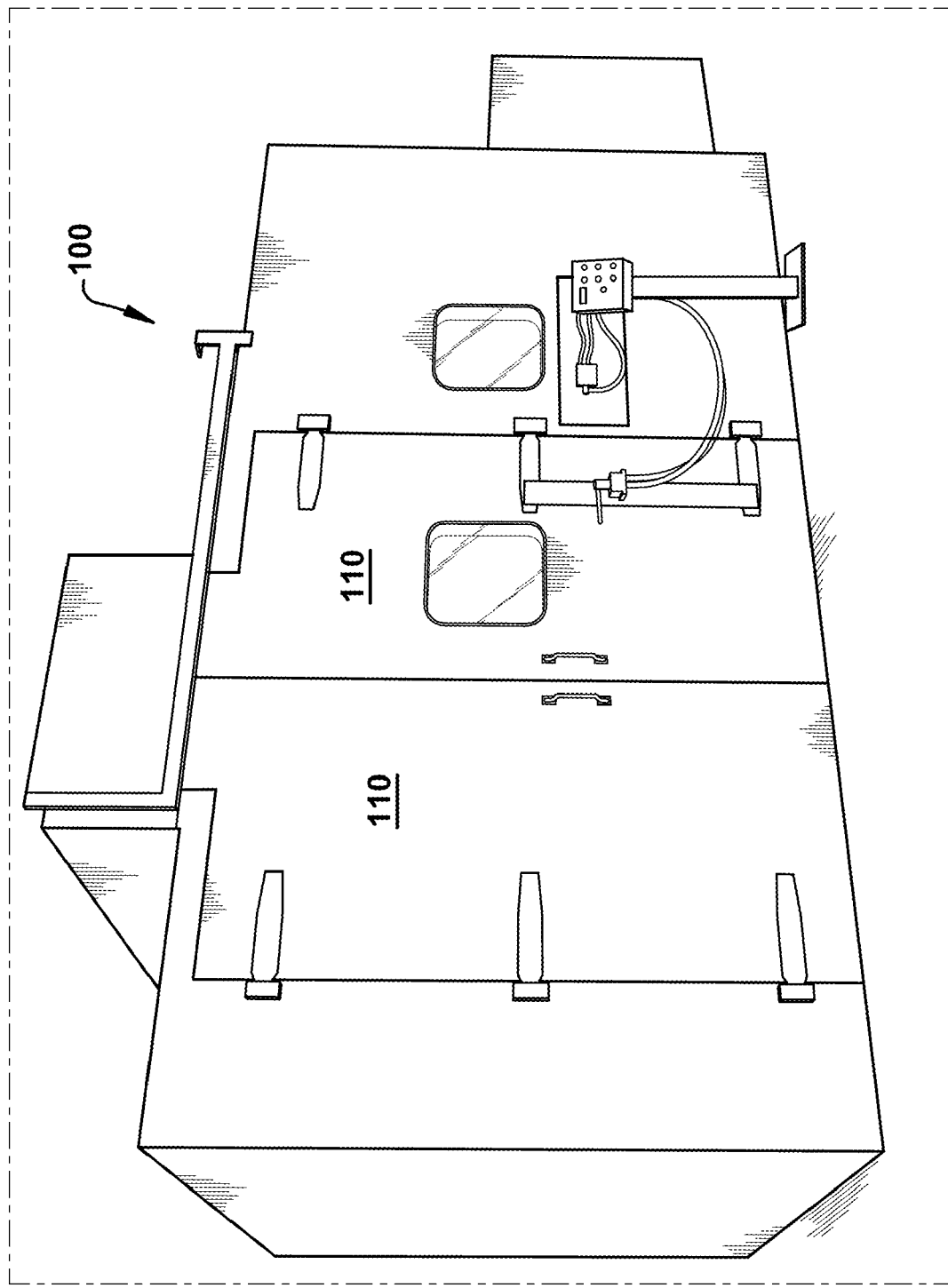
FIG. 1 illustrates a perspective illustration of a sound-reducing enclosure used to house the apparatus used to remove a blade, according to one aspect of the present invention.

FIG. 1 illustrates one embodiment of the present invention and shows a substantially sound proof enclosure 100 that contains a blade removal apparatus. The doors 110 may be opened to gain access to the interior of enclosure 100, and are preferably sized to permit passage of a compressor wheel. The sound proof enclosure 100 limits and reduces the ambient noise outside the enclosure to under about 80 dbA. Any suitable noise reducing materials or insulating layers can be used to construct the enclosure 100. The enclosure 100 can also incorporate a safety interlock to prevent operation with the door open.

Figure 2:
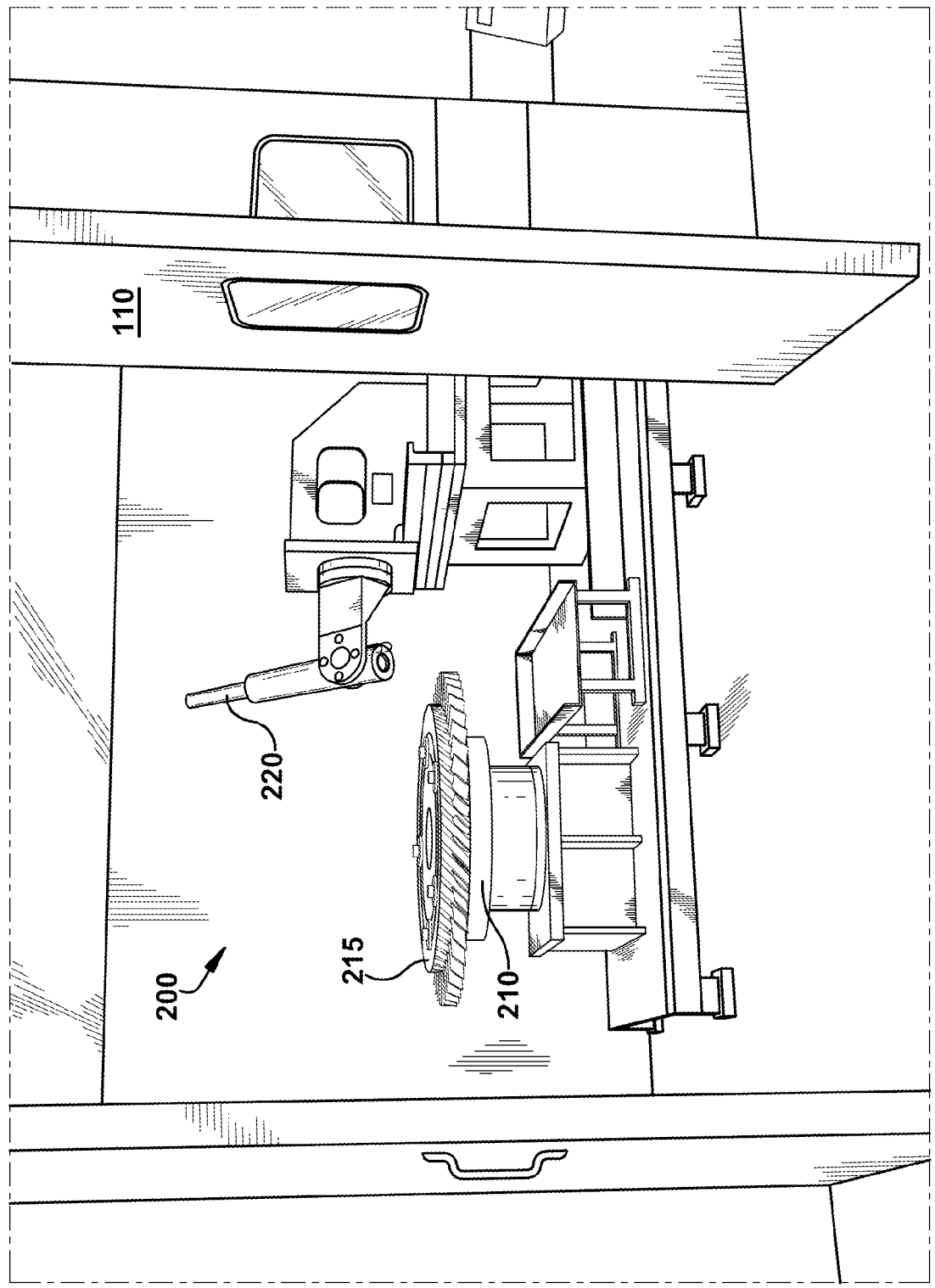
FIG. 2 illustrates a perspective illustration of the apparatus, contained within the enclosure of FIG. 1, used to remove a blade, according to one aspect of the present invention.

FIG. 2 illustrates a view of one embodiment of the apparatus used to remove blades of a compressor wheel though the open doors 110 of enclosure 100. The apparatus 200 has a variably indexable turntable 210 that can receive and support a compressor wheel 215. Not all compressor wheels have the same number of blades so the rotation of turntable 210 can be adjusted to index by the correct angle to advance one blade at a time. The indexing mechanism can be digitally controlled and adjusted.

The apparatus 200 also comprises a device, such as a hammer 220, for example, a pneumatic hammer (hereinafter referred to as a "hammer" which is not intended to limit the invention in any manner) that may use an air-cooled hardened bit to bear on the blade during removal. The air cooling can help to reduce the temperature of the workpiece and the tool during use. The hammer 220 can be advanced by a hydraulic device that advances the hammer as the blade is removed, thus keeping constant pressure on the blade. The hammer 220 can be rotated in two or more planes and advanced or retracted relative to the blade being removed. This enables the apparatus 200 to be used for a wide variety of blade and wheel sizes.

Means for communicating power to the hammer 220 may be provided in multiple ways. The hammer 220 may be powered by high-pressure gas through a gas flow path. The high-pressure gas may be supplied by umbilical from outside the enclosure. Alternately, hammer 220 may be powered by an electric solenoid supplied by electric power through an umbilical. An alternate power method could also include ultrasonic or subsonic acoustics, or explosive charge. The hammer can also be an impact hammer, pneumatic hammer or hydraulic hammer. A hydraulic ram may also be connected to hammer 220 to assist in the removal process.

Remote operation of some or all of the apparatus mechanisms can be provided. For example, a control panel on the exterior of enclosure 100 may be provided, and enable the turntable 210 to be indexed remotely from outside the soundproof enclosure 100. The hammer 220 can also be operated remotely from outside the sound proof enclosure. In alternative embodiments, a processor can be connected to the apparatus 200 via wired or wireless connection, and be used to control some or all of the components of the apparatus 200.

Figure 3:
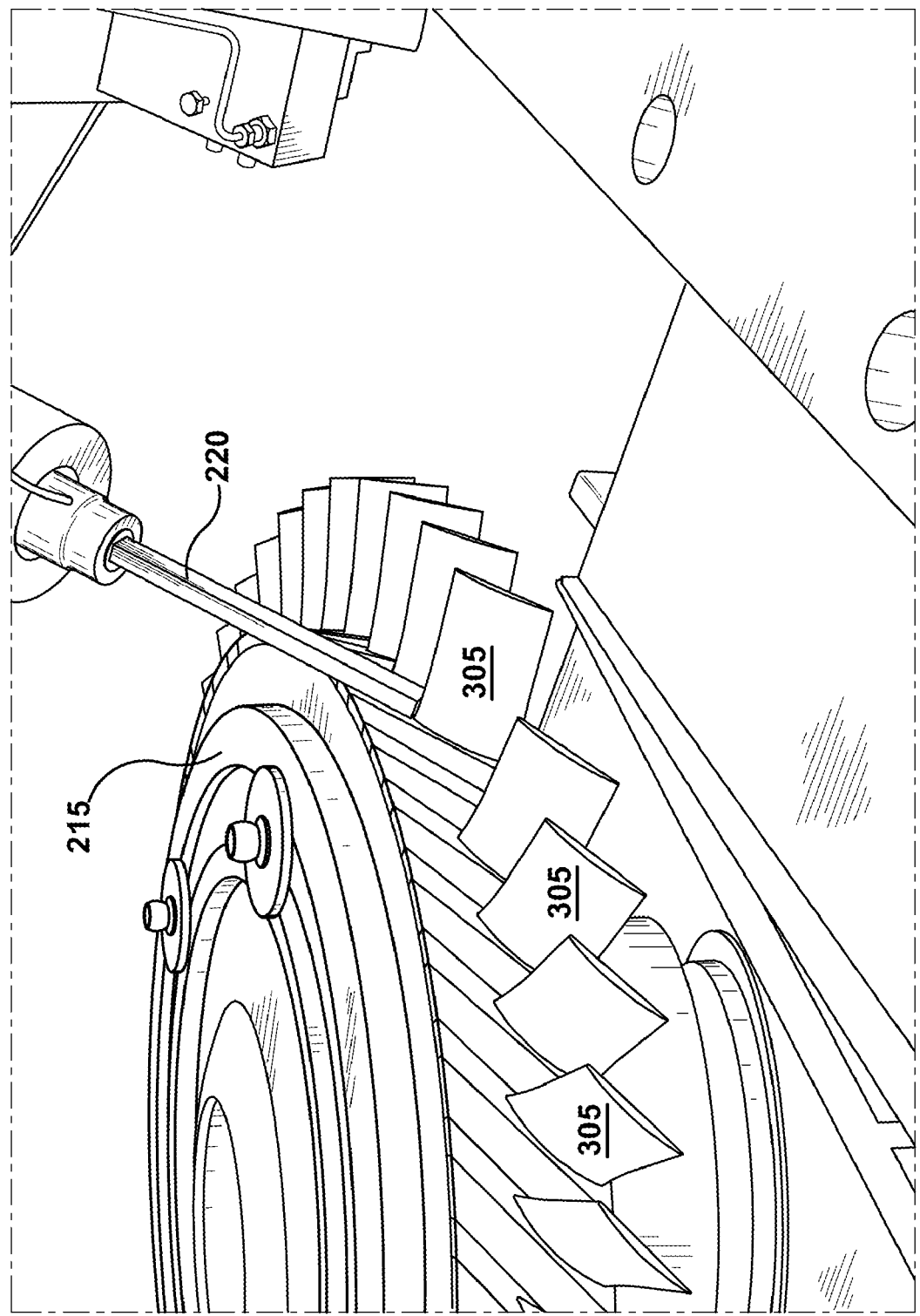
FIG. 3 illustrates a perspective illustration of a portion of a compressor wheel positioned to have a blade removed, according to one aspect of the present invention.

FIG. 3 illustrates a view of the hammer 220 contacting one of the blades 305 of compressor wheel 215. The hammer can be manipulated to drive blades 305 out of wheel 215 from either above (as shown) or below.

A method of removing a blade 305 will now be described according to one aspect of the present invention. A compressor wheel having multiple blades can be transported into enclosure 100 and mounted on turntable 210. A clamping mechanism (not shown) can be used to secure the wheel 215 to turntable 210. A lubricant, such as a penetrating lubricant, can be applied to the blade and dovetail joint to assist in the removal process. The apparatus can be programmed with the proper indexing value to advance the wheel one blade at a time.

The hammer can be positioned either above or below the blade to be removed. The hammer can be positioned by any suitable sensor (e.g., electrical or optical) or by manually sighting through a window of enclosure 100. A series of initial blows from hammer 220, while maintaining substantially continuous contact with the blade, sets the blade in motion, which may be continued by the force of a hydraulic ram. The operation can be continued until the blade is removed from wheel 215. The turntable 210 then shifts the next blade into position and the process can be repeated until all blades are removed.

A single head apparatus has been described, but it is to be understood that a multiple head apparatus (e.g., an apparatus having two or more hammers) can be employed. In addition, any blade or airfoil in a compressor or turbine wheel may be removed or installed with the apparatus and method of the present invention.

Additionally, means (not shown in the Figures) may be provided for dispensing a penetrating lubricant, if so desired, to assist in freeing the blade from the dovetail. Such a penetrating lubricant could be provided from an outside source via umbilical and communicated through a nozzle.

While various embodiments are described herein, it will be appreciated from the specification that various combinations of elements, variations or improvements therein may be made, and are within the scope of the invention.

The invention claimed is:

1. An apparatus adapted for removing a blade from a dovetailed slot in a wheel of a rotating machine comprising:
   at least one device adapted to apply a pushing force on a first surface of the blade;
   a turntable for supporting said wheel, said turntable having indexing capability to advance said wheel by a predetermined amount;
   a substantially sound proof enclosure that contains the wheel, the at least one device and the turntable, wherein the substantially sound proof enclosure includes at least one door for allowing passage of the wheel;
   a control panel located externally to the substantially sound proof enclosure;
   wherein, said at least one device can be used to remove one or more blades from said wheel.

2. The apparatus according to claim 1, wherein the at least one device comprises at least one of:
   an impact hammer, a pneumatic hammer, and a hydraulic hammer.

3. The apparatus according to claim 1, wherein the substantially sound proof enclosure reduces ambient noise outside said substantially sound proof enclosure to under at least about 80 dbA.

4. The apparatus according to claim 1, wherein the apparatus further comprises:
   a hydraulic ram connected to said at least one device, said hydraulic ram used to assist in removal.

5. The apparatus according to claim 4, wherein the at least one device comprises at least one of:
   an impact hammer, a pneumatic hammer, and a hydraulic hammer.

6. The apparatus according to claim 1, wherein the wheel is at least one of:
   a compressor wheel and a turbine wheel.

7. A method for removing a blade from a dovetailed slot in a wheel of a rotating machine comprising:
   providing at least one device adapted to apply a pushing force on a first surface of a blade;
   providing a turntable for supporting said wheel, said turntable having indexing capability to advance said wheel by a predetermined amount;
   providing a substantially sound proof enclosure that contains the wheel, the at least one device and the turntable, wherein the substantially sound proof enclosure includes at least one door for allowing passage of the wheel;
   providing a control panel located externally to the substantially sound proof enclosure;
   wherein, said at least one device can be used to remove one or more blades from said wheel.

8. The method according to claim 7, further comprising:
   mounting said wheel on said turntable.

9. A The method according to claim 7, further comprising:
   activating said at least one device to push said blade out of said dovetailed slot.

10. The method according to claim 9, further comprising:
    activating said turntable to advance said wheel by at least one blade, so that said at least one device may be positioned to remove another blade.

11. The method according to claim 7, further comprising:
    applying lubricant to at least a portion of said blade and at least a portion of said dovetailed slot to assist in removal.

12. The method according to claim 7, further comprising the step of selecting said rotating machine from, at least one of:
    a compressor wheel and a turbine wheel.

13. The method according to claim 7, wherein said providing at least one device step further comprises the step of:
    selecting said at least one device from at least one of, a hammer, an impact hammer, a pneumatic hammer, and a hydraulic hammer.

* * * * *